United States Patent [19]

Ball et al.

[11] Patent Number: 4,667,485
[45] Date of Patent: May 26, 1987

[54] ABSORPTION REFRIGERATION AND HEAT PUMP SYSTEM

[75] Inventors: David A. Ball, Westerville; William T. Hanna, Gahanna; William H. Wilkinson, Columbus, all of Ohio

[73] Assignee: Gas Research Institute, Chicago, Ill.

[21] Appl. No.: 839,599

[22] Filed: Mar. 14, 1986

[51] Int. Cl.⁴ .............................................. F25B 15/00
[52] U.S. Cl. ..................................... 62/476; 62/324.2; 62/335
[58] Field of Search ....................... 62/476, 324.2, 335

[56] References Cited

U.S. PATENT DOCUMENTS

| | | | |
|---|---|---|---|
| 3,483,710 | 12/1969 | Bearint | 62/476 X |
| 3,495,420 | 2/1970 | Loweth et al. | 62/476 |
| 4,402,795 | 9/1983 | Erickson | 62/476 X |
| 4,424,688 | 1/1984 | Wilkinson | 62/476 |
| 4,441,332 | 4/1984 | Wilkinson | 62/335 X |
| 4,475,361 | 10/1984 | Alefeld | 62/476 |
| 4,553,409 | 11/1985 | Furukawa | 62/476 |

Primary Examiner—Lloyd L. King
Attorney, Agent, or Firm—Robert B. Watkins

[57] ABSTRACT

An absorption refrigeration/heat pump system of the four chamber multiple subsystem type in which an absorption power module is employed having a desorber, condenser, and second desorber combined for more effective heat transfer and thermal efficiency.

29 Claims, 12 Drawing Figures

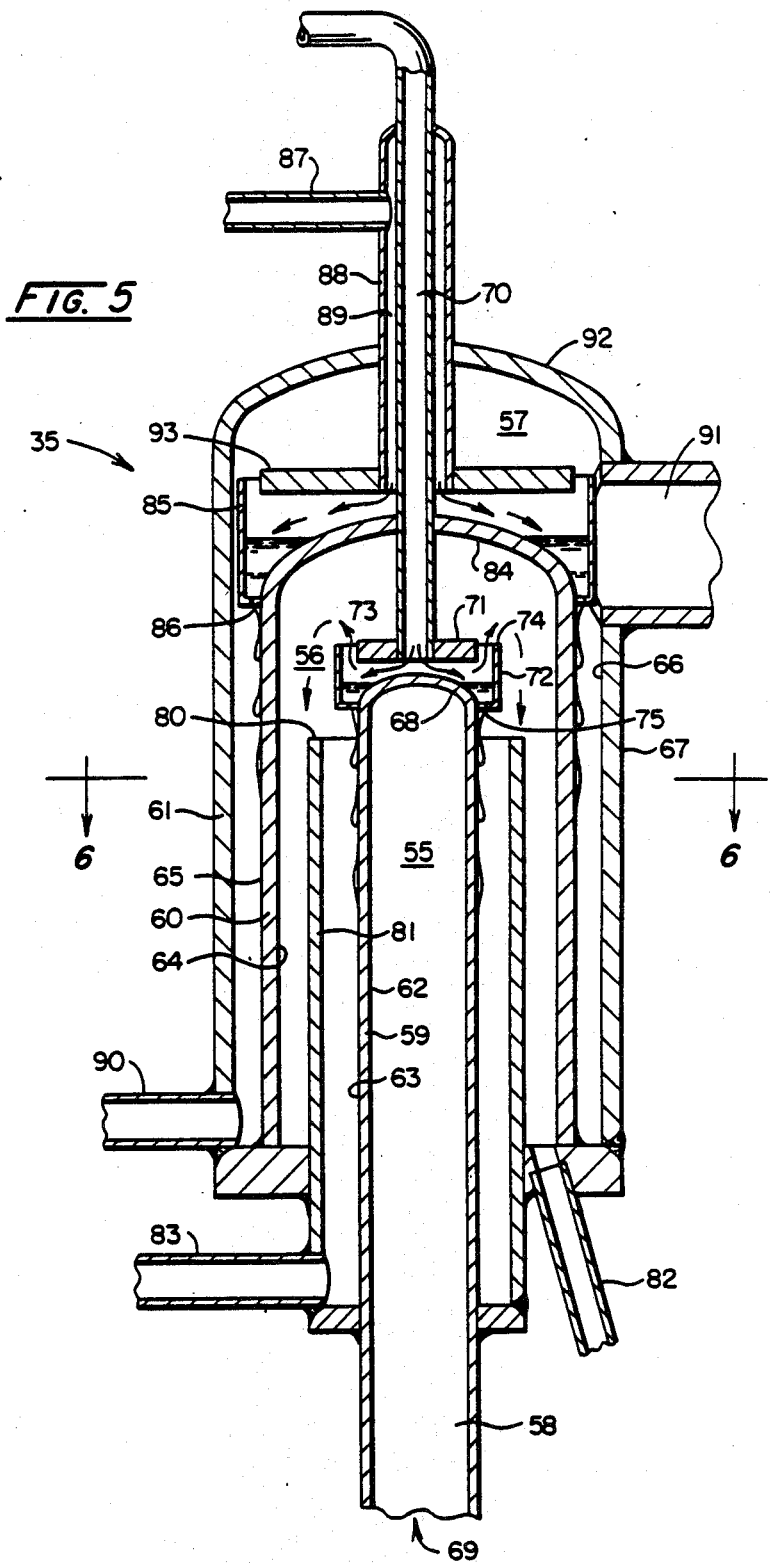

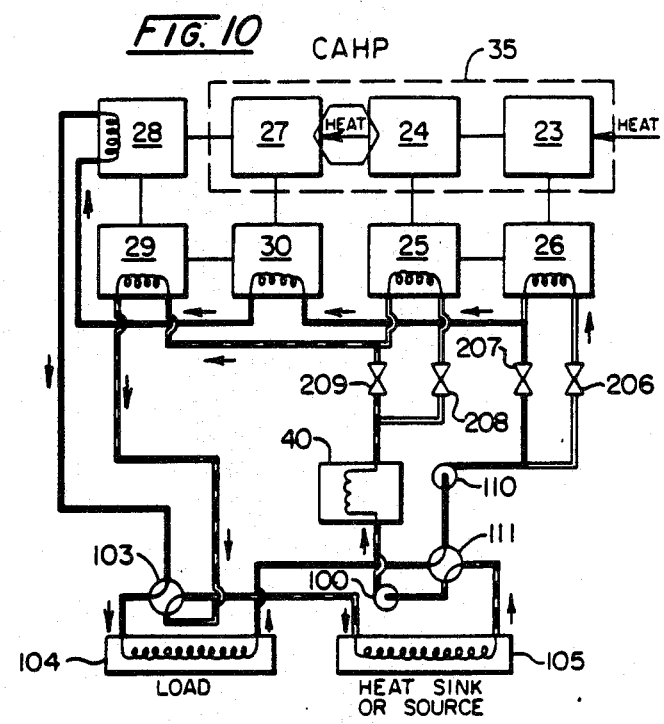
FIG. 10
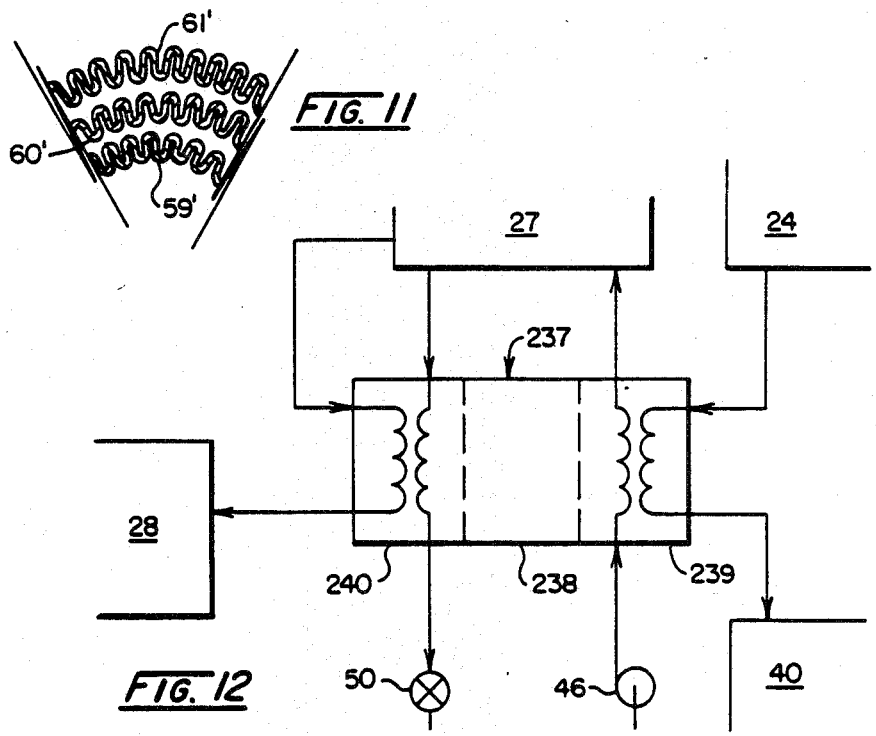
FIG. 11
FIG. 12

ABSORPTION REFRIGERATION AND HEAT PUMP SYSTEM

FIELD OF THE INVENTION

This invention relates to absorption refrigeration/heat pump systems. More particularly it relates to a four chamber heat pump system which employs an absorption power module having a desorber, condenser, and second desorber combined for more effective heat transfer efficiency, and thermal efficiency in the absorption heat pump system.

BACKGROUND OF THE INVENTION

In the description to follow it is important that a clear distinction be made between solutions entering and leaving various components. Therefore, adopted herein is the notation of the standard setting body on absorption systems in the U.S., the ASHRAE Technical Committee (8.3) on absorption machines. Their notation is given in the following quote from the ASHRAE 1979 Equipment Hand Book, Chapter 14:

"To avoid confusion of terminology in the absorption field, ASHRAE Technical Committee (8.3) recommends that the following standarized terms for the absorbent-refrigerant solution. Weak absorbent is that solution which has picked up refrigerant in the absorber and is then weak in its affinity for refrigerant. Strong absorbent is that solution which has had refrigerant driven from it in the generator and, therefore has a strong affinity for refrigerant".

In the past, many inventions have been made in the field of absorption refrigeration/heat pump system. A thoroughly comprehensive discussion of the problems and prior art activities is presented in U.S. Pat. No. 4,441,332 W. H. Wilkinson. The disclosure of that patent is included herein by reference and this invention relates to improvements in that system.

Another prior art patent of interest to the background of this invention is U.S. Pat. No. 4,424,688 W. H. Wilkinson. That patent relates to a power unit as defined therein, for an absorption heat exchange system wherein the refrigerant/absorbent solution is progressively desorbed in stages and then condensed. It provides for increased efficiency in the desorption process, by means of a maximized heat exchange system configuration.

Other patents in this general field include U.S. Pat. No. 3,495,420 Loweth et al. which shows the typical unit in which the refrigerant/absorbent solution pair is subjected to heat by the application of heat to the bottom and sides of a reservoir container.

As explained in the Wilkinson patent-"332", the invention to which this application is directed is termed a four chamber system. Two chambers are operatively connected to one two chamber subsystem and two other chambers are operatively connected to another two chamber subsystem. One subsystem employs a higher temperature solution pair having good higher temperature performance, preferably lithium-bromide/water, with water as a refrigerant and lithium-bromide as the absorbent. The other subsystem employs a different solution pair, preferably ammonia/water with ammonia as the refrigerant and water as the absorbent.

The first mentioned subsystem is operated at a higher temperature, and the system configuration allows the selected pair to avoid freezing and crystalization problems. The other second subsystem employs a lower temperature pair having good low temperature performance properties and is operated at lower temperatures in the range where an organic would be expected to operate successfully without toxicity, corrosion or stability problems and where temperatures below freezing are acceptable. In the prior patent, the first subsystem and the second subsystem; i.e. higher temperature and lower temperature subsystem respectfully, are operatively combined and connected by placing the higher temperature condenser in heat exchange relationship with the lower temperature desorber, with other components of the total system also arranged in specified combinations.

In the disclosure to follow of this invention, the first subsystem may be interchangeably termed the high subsystem and the second the low subsystem. Components of each may be termed in the same manner, respectively.

SUMMARY OF THE INVENTION

In one sense, this invention is the unique combination of various beneficial aspects of the inventions of W. H. Wilkinson disclosed and claimed in U.S. Pat. Nos. 4,424,688 and 4,441,332. In summary, this invention is an absorption refrigeration and heating system in connection with a cooling or heating load and a heat sink or source to selectively provide heat to or remove heat from the load, comprising: (a) at least one first subsystem for operation at higher temperature and at least one second subsystem for operation at lower temperature relative to the first subsystem; (b) each subsystem having components of absorber means, desorber means, condenser means, and evaporator means operatively connected together; (c) with the desorber means of the first subsystem, the condenser means of the first subsystem, and the desorber means of the second subsystem in sequential heat exchange relationship within a power module in which external heat is applied to the system within a central chamber of the module and is progressively exchanged outwardly through coaxial second and third chamber means.

In such a system, the improvement comprises combining the higher temperature absorber, the lower temperature condenser, and the lower temperature desorber in a unitary power module wherein these component means progressively exchange heat outwardly and progressively from the higher temperature desorber to the higher temperature condenser to the lower temperature desorber.

A further aspect of the invention is the construction of the power unit including the means for separating the desorption process in the second chamber means from the condensing process in the second chamber means, as well as features of the means for dispersing the refrigerant/absorbent solution on the outer walls of the chambers.

Its an object of the invention to further improve the performance, efficiency, operation, of the four chamber combined system while further reducing the manufacturing cost of the system.

The foregoing and other advantages of the invention will become apparent from the following disclosure in which a preferred embodiment of the invention is described in detail and illustrated in the accompanying drawings. It is contemplated that variations in procedures structural features and arrangement of parts may appear to the person skilled in the art without departing from the scope or sacrificing any of the advantages of the invention.

Other objectives and features of the invention will be apparent and understood from the detailed description and the accompanying drawings which follow.

DESCRIPTION OF THE DRAWINGS

FIG. 5 is a partial sectional elevation view of an apparatus of this invention.

FIG. 10 is a simplified schematic view of the embodiment of this invention shown in FIG. 7, in the heating mode of operation under low ambient temperature conditions.

FIG. 11 is a sectional view of a portion of another form of apparatus shown in FIG. 6.

FIG. 12 is a schematic view of a heat exchanger used in the embodiment of this invention shown in FIG. 7.

BEST MODE FOR CARRYING OUT THE INVENTION

Figure 1:
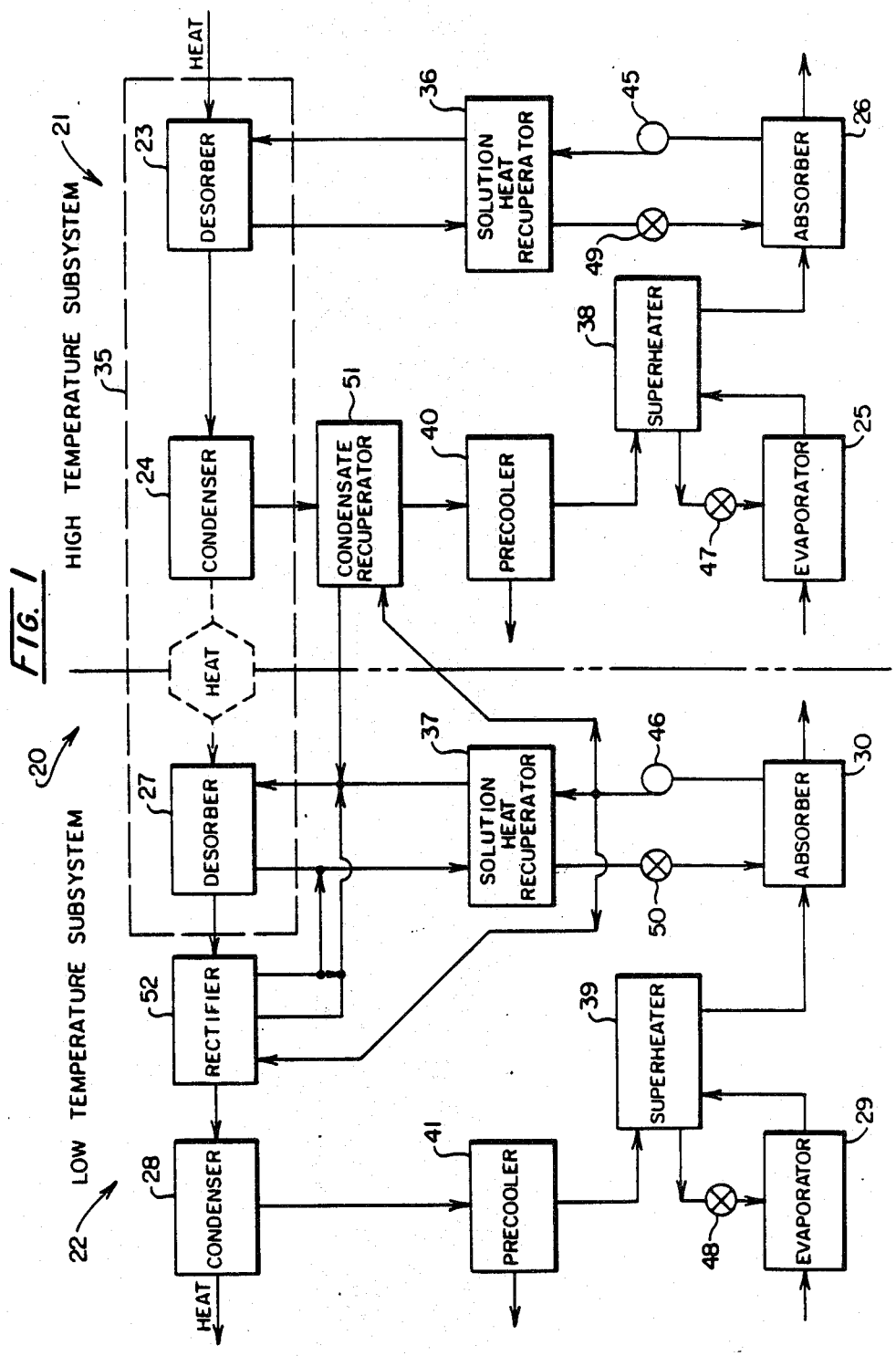
FIG. 1 is a schematic view of an absorption refrigeration system which includes this invention.

Referring to FIG. 1 the four chamber system of this invention 20 comprises a high temperature subsystem 21 and a low temperature subsystem 22. The high subsystem 21 includes a desorber 23, a condenser 24, an evaporator 25, and absorber 26. The low subsystem 22 includes a desorber 27, a condenser 28, an evaporator 29, and an absorber 30.

The high temperature desorber 23, the high temperature condenser 24, and the low temperature desorber 27 are within an absorption power module 35, shown schematically by dashed lines on FIG. 1.

A recuperator 36 is provided between the desorber 23 and the absorber 26 to enhance the solution heat exchange in the high temperature subsystem 21. In a similar manner, a recuperator 37 is provided between the desorber 27 and the absorber 30 to enhance the solution heat exchange in the low temperature subsystem 22.

Further system enhancing optional components include superheaters 38 and 39 in the high temperature and low temperature subsystems 21 and 22 respectively; as well as precoolers 40 and 41 in the respective subsystems.

In a preferred embodiment of this invention, in the first high temperature subsystem 21, water is the refrigerant and Lithium-Bromide/Water (LiBr/H$_2$O) solution is the absorbent. In this preferred embodiment, the lower temperature subsystem is operated with ammonia and water, with ammonia as the refrigerant and ammonia/water solution as the absorbent.

Each fluid subsystem operates without fluid connection to the other and in a conventional manner. Weak solution is conveyed by pumps 45, 46 from absorbers 26, 30 through recuperators 36, 37 to desorbers 23, 27, respectively. Desorbed vapor is conveyed to condensers 24, 28 respectively. Condensed refrigerant is conveyed through precoolers 40, 41 and superheaters 38, 39 to expansion means 47, 48 where the refrigerant is reduced in pressure and conveyed to evaporators 25, 29, respectively. Low pressure refrigerant passes through superheaters 38, 39 to absorbers 26, 30.

Strong solution is conveyed from desorbers 23, 27 through recuperators 36, 37 to expansion means 49, 50, where pressure is reduced to that of the incoming refrigerant at the absorbers 26, 30.

Further enhancements to the system have been conceived and shown to be beneficial. These include a condensate recuperator 51 in the connection between condenser 24 and precooler 40 to recoup heat from the high temperature subsystem 21 to the low temperature subsystem 22. It has also been found beneficial to provide a rectifier 52 between the desorber 27 and the condenser 28 to further strip water from the ammonia water vapor passing through the subsystem at this point. Because of the low temperature of the condenser 28 and evaporator 29, the further removal of water from the vapor in the rectifier 52 increases the efficiency of the ammonia refrigerant.

Figure 7:
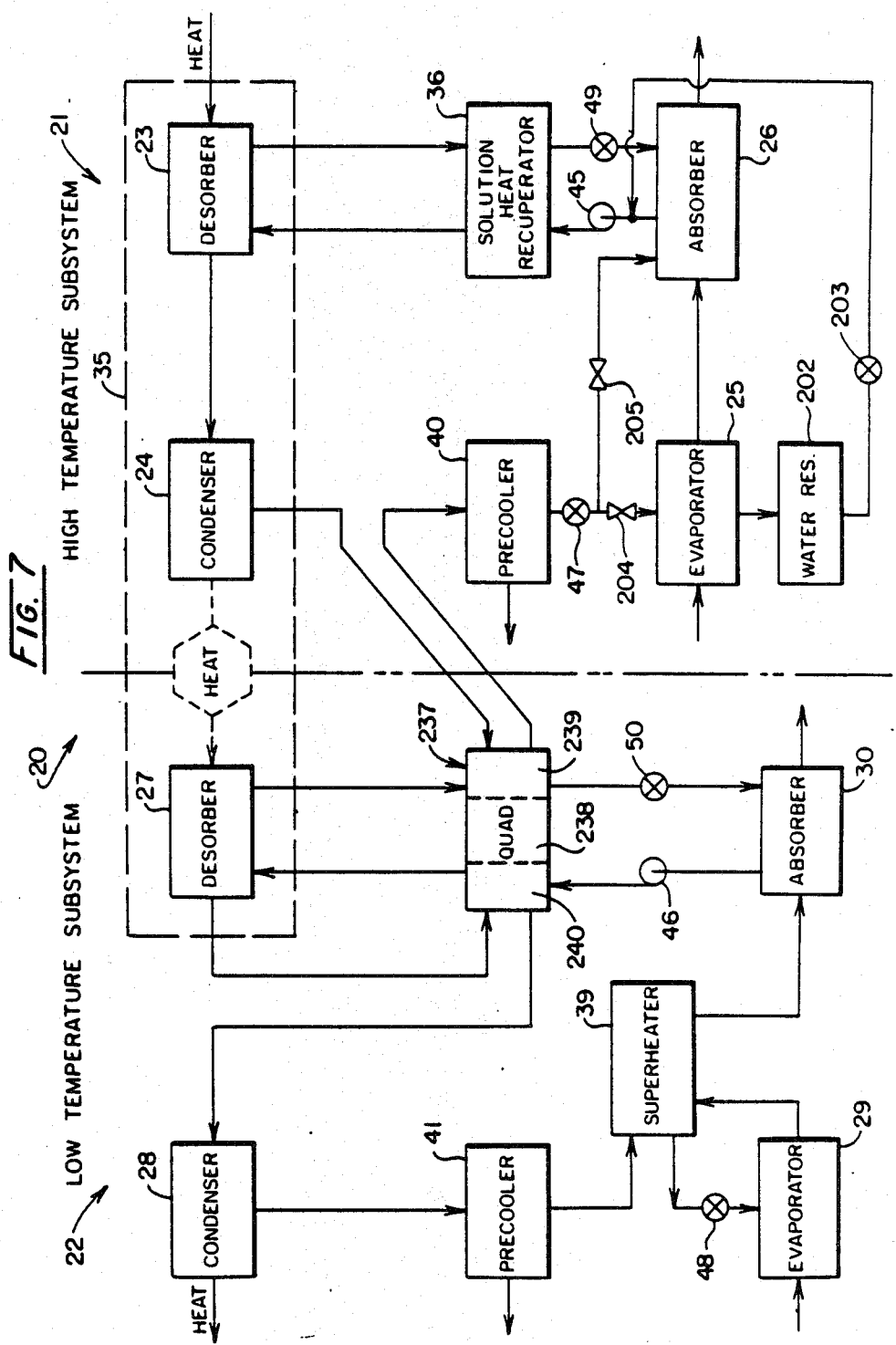
FIG. 7 is a schematic view of another embodiment of an absorption refrigeration system which includes this invention.

Referring to FIG. 7, another embodiment of the four chamber system of this invention 20 also comprises a high temperature subsystem 21 and a low temperature subsystem 22. The high subsystem 21 includes a desorber 23, a condenser 24, an evaporator 25, and absorber 26. The low subsystem 22 includes a desorber 27, a condenser 28, an evaporator 29, and an absorber 30.

The high temperature desorber 23, the high temperature condenser 24, and the low temperature desorber 27 are within an absorption power module 35, shown schematically by dashed lines on FIG. 7.

A recuperator 36 is provided between the desorber 23 and the absorber 26 to enhance the solution heat exchange in the high temperature subsystem 21. In a similar manner, a Quad heat exchanger 237, containing a recuperator section 238, a subcooling section 239, and a rectifier section 240, is provided between the desorber 27 and the absorber 30 to enhance the solution heat exchange in the low temperature subsystem 22.

The "QUAD" 237, shown in FIG. 12 handles four flow streams through one component. There are three heat transfers, all of which end up in the solution going from pump 46 to desorber 27. Exchanged are QCR, the condensate recuperator heat—QSHR, the solution heat and recuperator heat—and QR the rectifier heat. The QUAD 23 does the same functions as components 37, 51, and 52, as shown on FIG. 1.

Further system enhancing option components include a superheater or dryer 39 in the low temperature subsystem as well as a precooler 40 in the high temperature subsystem 21.

In a preferred practice of this embodiment, in the first high temperature subsystem 21, water is the refrigerant and the Lithium-Bromide/Water (LiBr/H$_2$O solution is the absorbent. In this preferred embodiment the lower temperature subsystem is operated with ammonia and water, with ammonia as the refrigerant and ammonia/water solution as the absorbent.

Each fluid subsystem operates without fluid connection to the other and in its own conventional manner. Weak solution is conveyed by pumps 45, 46 from absorbers 26, 30 through recuperator 36 and recuperator section 238, of Quad 237, to desorbers 23, 27, respectively. Desorbed vapor is conveyed through precooler 40 and subcooler section 239, of Quad 233, or through precooler, 41, and superheater (dryer) 39 to expansion means 47, 48 where the refrigerant is reduced in pressure and conveyed to evaporators 25, 29, respectively. Low pressure refrigerant passes directly, or through superheater 39, to absorbers 26, 30.

Strong solution is conveyed from desorbers 23, 27 through recuperators 36, 238 to expansion means 49, 50 where pressure is reduced to that of the incoming refrigerant at the absorbers 26, 30.

Further enhancements to the system have been conceived and shown to be beneficial. These include a subcooling condensate recuperator section 239, in Quad 237, in the connection between condenser 24 and precooler 40 to recoup heat from the high temperature subsystem 21 to the low temperature subsystem 22. It has also been found beneficial to provide a rectifier section 240 in Quad 237 between the desorber 27 and the condenser 28 to further strip water from the ammonia water vapor passing through the subsystem at this point. Because of the low temperature of the condenser 28 and evaporator 29, the further removal of water from the vapor in the rectifier section 240, in Quad 237 increases the efficiency of the ammonia refrigerant.

In addition, a refrigerant storage reservoir 202 in the high temperature subsystem 21 allows adjustment of the concentration in that subsystem during the Cold Ambient Heat Pump (CAHP) mode of operation. Such a reservoir 202 is provided to accumulate refrigerant during Air Conditioning (A/C) and Warm Ambient Heat Pump (WAHP) modes of operation; a drain valve 203 is provided to trap this liquid and release it during CAHP operation to dilute the LiBr solution and reduce peak system temperatures.

Valve means 204 and 205 are provided to switch in and out of CAHP mode. In A/C and WAHP modes, valve means 204 is open and valve means 205 is closed, so all refrigerant is delivered to evaporator 25 for evaporation. In CAHP mode, valve means 204 is closed and valve means 205 is opened, and all refrigerant liquid bypasses evaporator 25 and is mixed with the solution entering absorber 26. This eliminates the evaporator 25 from the system, so all residual liquid will be drained by valve 203 and is not subject to freezing as it would otherwise do in "cold" ambient temperatures (below about 40° F.). In the CAHP mode, absorber 26 is a mixing chamber, mixing solution and refrigerant together so that desorber 23 and condenser 24 can function normally and deliver heat to desorber 27.

ABSORPTION POWER MODULE

The absorption power module 35 is so termed in reference to the fact that it structurally combines three components of the combined four chamber system. The combination of the high desorber 23 in heat transfer/exchange relationship with the condenser 24 and the desorber 27 greatly enhances the effectiveness of of the heat that is provided to the total system at the desorber 23.

It will be understood by those skilled in the art that the maximum use of the input heat energy to the desorber 23 is of critical importance to improve performance in absorption refrigeration/heat pump systems.

Referring to FIG. 5 the absorption power module 35 includes a central chamber 55, a second chamber 56, and a third chamber 57.

Figure 6:
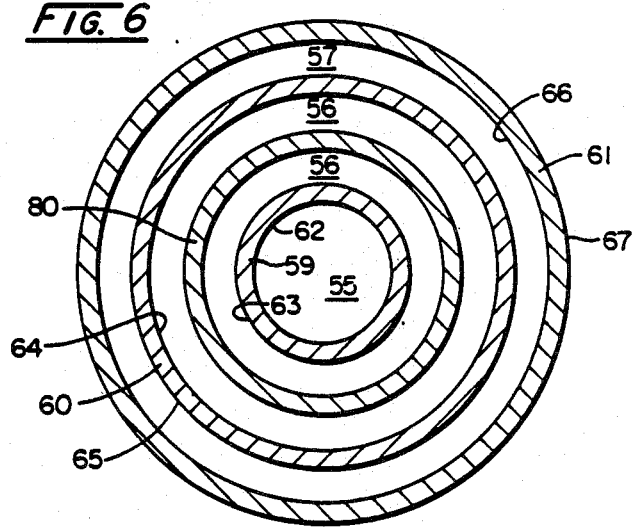
FIG. 6 is a sectional view taken in the plane 6—6 of FIG. 5.

In the preferred embodiment, the module 35, and its component parts, are substantially circular in cross section, as shown in FIG. 6. The components are generally cylindrical in shape and coaxial about a central axis 58. The cylindrical configuration is preferred because it is more simple to manufacture than other shapes, and the component parts are less expensive and readily available in the form of tubes and pipes of various compositions, including steel, stainless steel, and other alloys. Nevertheless it is envisioned that the advantages of this invention could be obtained by other cross sectional configurations such as fluted tubes (See FIG. 11), squares and rectangles, etc.

Each chamber means is encompassed by walls or wall members 59, 60, and 61. Chamber means 55 is encompassed by the wall member 59 having an inner wall 62 and an outer wall 63. The second chamber means 56 is encompassed by an inner wall 64 of the wall member 60 and provides an outer wall 65. The third chamber means 57 is encompassed by the wall member 61 having an inner wall 66 and an outer wall 67.

The central chamber 55 is closed at its upper end by a dome or ring-like flanged closure means 68.

In the operation of the module 35 in the absorption refrigeration heating system of this invention heat is applied to the inside of the chamber 55. In the preferred embodiment, steam is directed upward through an inlet 69 and condenses on the inner wall 62. Heat is conducted through the wall member 59 to the outer wall 63.

An inlet conduit 70 is provided at the upper end of the module 35, terminating in the vicinity of the dome closure means 68. An annular baffle ring 71 is fastened to the end of the conduit 70, extending laterally toward a cylindrical wall 72 of a reservoir 73. The reservoir 73 is generally cup shaped having an aperature 74 at the top and a plurality of aperatures 75 at the bottom along the outside wall 63 of the chamber 55.

In operation, weak LiBr/H$_2$O solution is admitted to the reservoir through the conduit 70. From the reservoir the weak solution passes downward through the aperature 75 and runs down the outer wall 63, where heat conducted from the chamber 55 causes the vaporization of the water refrigerant. The water vapor passes upward and over an upper end surface 80 of a separator wall means 81, impinging on the inner wall 64 of the second chamber 56 where it condenses and runs down to the collector means near the bottom and is carried away through a conduit 82 to the evaporator 25 of the high temperature subsystem 21.

Strong LiBr/H$_2$O solution is collected near the bottom of the outer wall 63 and is conveyed by a conduit 83 to the absorber 26 of the high temperature subsystem 21. The second chamber means 56 is provided with an upper dome closure member 84, upon which a second cuplike reservoir 85 is attached to the dome closure member 84 and is provided with a plurality of aperatures 86.

A second inlet 87 is connected to a conduit 88 surrounding and encompassing the first inlet conduit 70 with a space 89 between the conduit 70 and the conduit 88. This space is a means through which a weak solution of $H_2O/NH_3$ is provided to the reservoir 85. This weak solution passes through aperatures 86 and flows down the outer wall 65 where heat is conducted from the condensation on the inner wall 64, causes evaporation of ammonia, leaving a strong solution to collect near the bottom of the chamber 57 which is conveyed away in a conduit 90. The vaporous $NH_3$ passes from the chamber 57 through a conduit 91 to a rectifier and/or condenser of the low temperature subsystem 22. A domed closure member 92 is provided at the upper end of the chamber 57, and a baffle 93 is provided on the end of the conduit 88 to prevent solution lost due to splattering and bubbling of the weak solution in the reservoir 85. It has been found in the construction and operation of the power unit 35 that the separator wall 80 is an important feature in the construction of the module, as it prevents water vapor from being absorbed in the bubbling and splashing solution.

Because of the coaxial arrangement, the heat transfer process between the three components in the power module 35 is greatly enhanced and highly efficient making possible the use of a unit only about six inches in overall diameter with a height of about five feet for a unit capable of generating 10,000 BTU per hour. Larger or smaller units can be provided for different capacities.

AIR CONDITIONING MODE (A/C)

Figure 2:
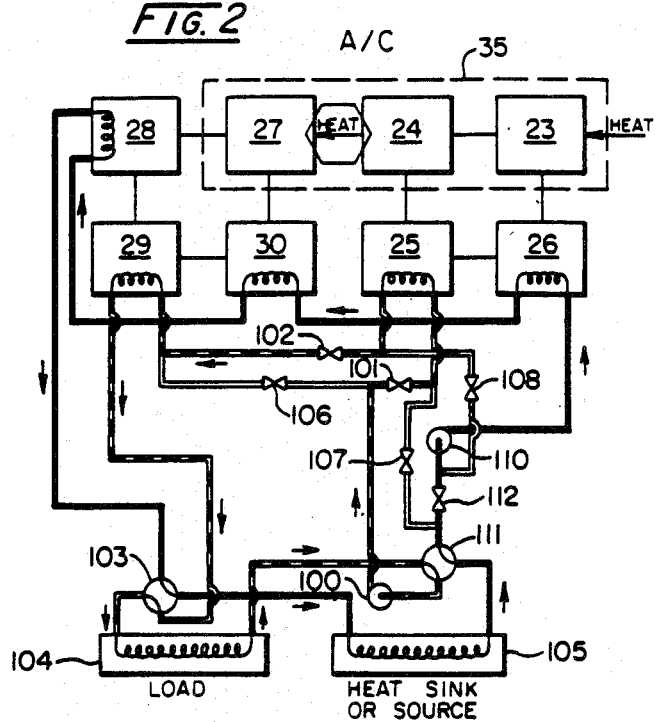
FIG. 2 is a simplified schematic view of the absorption refrigeration system of this invention in the air conditioning mode of operation.

Referring to FIG. 2 a simplified version of the absorption refrigeration/heat pump system of this invention is disclosed, revealing the hydronic fluid circuit which carries a heat conducting liquid fluid, such as water and ethylene glycol into heat exchange relationships with various components of the system, other than those components 23, 24, and 27 which are combined in the absorption power module 35.

In the air conditioning mode, warmed hydronic fluid is conveyed by a pump 100 through an open shutoff valve 101 to a heat exchanger in the high evaporator where it is cooled. From the evaporator 25 hydronic fluid is conveyed through an open shutoff valve 102 to a heat exchanger in the low temperature evaporator 29. From there, the fluid is conveyed through a four way valve 103 to a heat exchanger coil 104 in the cooling load. Ordinarily, the cooling load is the warm air circulating from the air conditioned space. The warmed hydronic fluid is then returned to the pump 100 through four way valve III. Additonal shutoff valves 108, 106, and 107 are closed in this mode restricting flow to the path above.

During the same operation, hydronic fluid is conveyed by a pump 110 through a heat exchanger in the high temperature absorber 26 and a heat exchanger in low temperature absorber 30. From the absorber 30, the fluid passes through a heat exchanger in the low temperature condenser 28 to a four way valve 103 and then to a heat exchanger coil 105 which is operating as a heat sink. Usually in the normal air conditioning mode the coil 105 is in conductive contact with the outside air. From the coil 105, the second hydronic fluid passes through the four way valve 111 and the opened shutoff valve 112 and then back to the pump 110.

Figure 8:
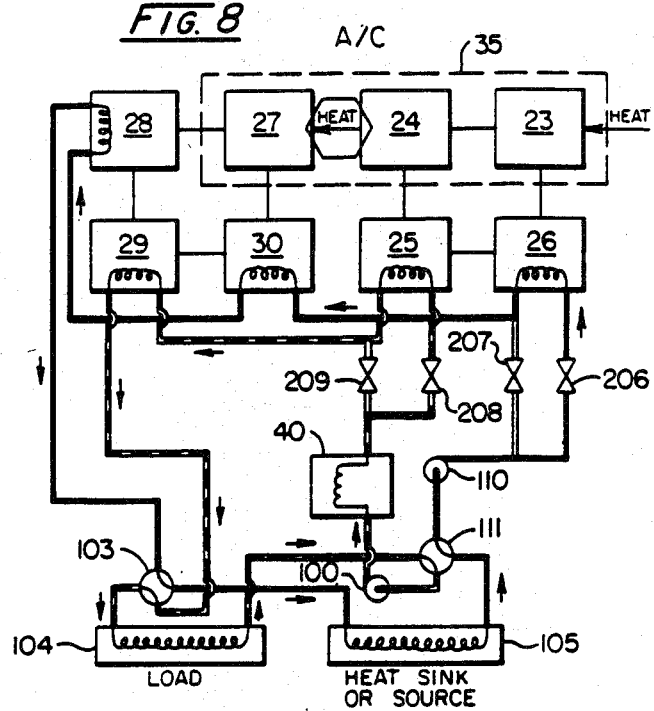
FIG. 8 is a schematic view of the embodiment of this invention shown in FIG. 7, in the air conditioning mode of operation.

In the simplified subsystem, shown in FIG. 8, a slightly simplified hydronic valving system is shown in the A/C mode. This simplified valving system includes valves 206, 207, 208, and 209 as equivalent to valves 101, 102, 108, 106, 107 and 112. Except for these valve changes FIGS. 2 and 8 are the same. In FIG. 8, valves 206 and 208 are open and valves 207 and 209 are closed. These valve positions place both evaporators 25 and 29 in series with the load and the absorbers 26 and 30 are in series with condenser 28 and the heat sink 105. As pointed out in the discussion above, normal air conditioning results.

WARM AMBIENT HEAT PUMP MODE (WAHP)

Figure 3:
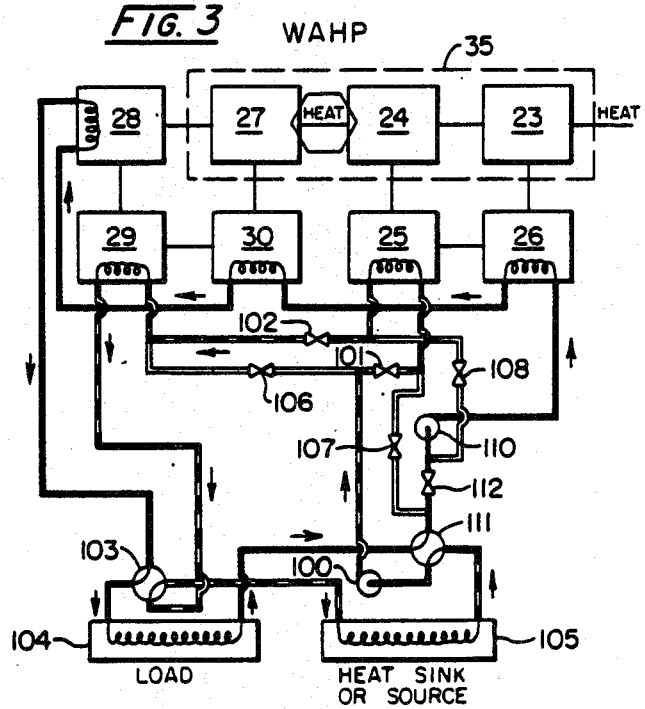
FIG. 3 is a simplified schematic view of the absorption system of this invention in the heating mode of operation under high ambient temperature conditions.

When the outside air temperature or other source temperature is above about 45 degrees F, the system is operated as a "warm ambient" heat pump as shown in FIG. 3. For operation in this mode, four way valves 103, and 111 are set to convey hydronic fluid from the low temperature condenser 28 through the coil of the heat exchanger 104 to shutoff valve 112, which remains open; then to the pump 110, the high temperature absorber 26, and the low temperature absorber 30, from which it is returned to the condenser 28. Shutoff valves 108, 106, and 107 remain closed in this mode of operation.

Hydronic fluid is conveyed from the pump 100, to the open valve 101, the high temperature evaporator 25, through the opened valve 102 the low temperature evaporator 29, the four way valve 103 and to the heat exchanger coil 105 which is operating as a source. From heat exchanger 105 fluid returns to the pump 101 through the four way valve 111.

In general, the parameters of operation of the high temperature subsystem 21 and the low temperature subsystem 22 are setforth in the previously referred to U.S. Patent W. H. Wilkinson-"332".

Figure 9:
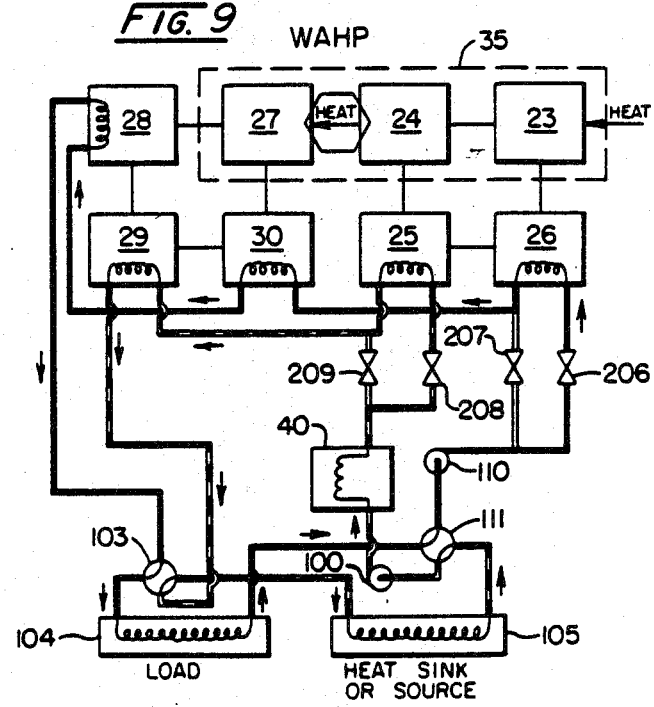
FIG. 9 is a simplified schematic view of the embodiment of this invention shown in FIG. 7, in the heating mode of operation under high ambient temperature conditions.

In FIG. 9 the alternative embodiment of the system is shown in the WAHP mode. As with the system discussed above only valves 103 and 111 are turned to interchange the positions of the load 104 and the heat source/sink 105. In FIG. 9 valves 206 and 208 remain open and valves 207 and 209 remain closed.

COLD AMBIENT HEAT PUMP MODE (CAHP)

Figure 4:
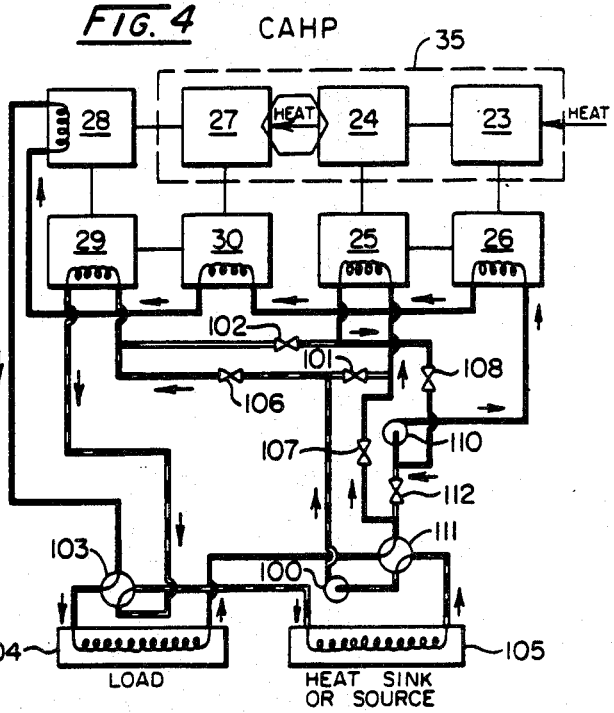
FIG. 4 is a simplified schematic view of the absorption system of this invention in the heating mode of operation under low ambient temperature conditions.

When the temperature of the outside air or other heat source falls below about 45 degrees F., the system is set and operated as shown in FIG. 4. In this mode, the four way valves 103 and 111 remain in the same position as shown and described for the warm ambient heat pump mode shown in FIG. 3. Warm fluid from the low temperature condenser 28 is conveyed through the four way valve 103 into the heat exchanger 104 where it transmits heat to the load. From the coil 104 fluid passes through the four way valve 111, from which it passes through the shutoff valve 107 which has been opened to the high temperature evaporator 25. In this mode, the shutoff valves 112, 101, and 102 are closed.

Fluid from the evaporator 25 is conveyed through the valve 105 which is opened in this mode, to the pump 110. From the pump 110, the fluid is conveyed through the absorbers 26 and 30 respectively, after which it passes back to the condenser 28.

"Warm" fluid from the pump 100 is conveyed past closed valve 101 through valve 106, which is open in this mode, through the low temperature evaporator 29, the four way valve 103 and the coil of the heat exchanger 105, which is operating as the heat source. From the heat exchanger coil 105, fluid passes back to the pump through the two way valve 111.

Operation of the system 20 in the cold ambient heat pump mode is further disclosed in the earlier reference patent, W. H. Wilkinson - "332".

The functioning of the alternative system in CAHP mode is shown in FIG. 10. To change the alternative system from WAHP to CAHP the hydronic valves 206, 207, 208, and 209 are turned. Thus in CAHP mode valves 206 and 208 are closed valves 207 and 209 are opened. These changes force the hydronic fluids to bypass the evaporator 25 and the absorber 26 in the high temperature subsystem 21. As a result, the hydronic fluid circulated through the heat source 105 will bypass evaporator 25, thus preventing freezing of evaporator 25, since the hydronic fluid will be below 32° F., the freezing point of the water refrigerant in evaporator 25. The hydronic fluid will also bypass absorber 26, preventing heat transfer from the solution to the hydronic fluid. While this reduces the heat output from the absorber 26, it increases system COP by maximizing the heat leaving the high temperature subsystem 21 which is transferred to the low temperature subsystem 22 through condenser 24 and desorber 27 within temperature limits for pump 45 established by precooler, 40.

In addition to turning hydronic valves as discussed above, further system changes are made when switching in or out of the CAHP mode. Referring to FIG. 7, in A/C and WAHP mode, valve 204 is open and valves 203 and 205 are closed. For CAHP operation, valve 204 is closed and valves 203 and 205 are opened. Opening valve 203 dilutes the LiBr solution for improved CAHP performance. Opening valve 205 and closing valve 204 diverts the high temperature subsystem refrigerant from evaporator 25 to absorber 26 for mixing with the solution. When returning from CAHP to WAHP modes the system is operated at normal WAHP conditions and capacity to refill the reservoir 202 in a single, extended time operating cycle.

It is conceived that the operation of CAHP system 21 with the power module 35 may be conveniently sized for various heating/cooling loads by connecting a plurality of power units 35 in parallel, with the other components connected to the parallel power units 35. By this means, the range of product sizes can be built around a single power module design and a single set of tooling. A reasonably sized system for space heating and cooling is likely to require up to six absorption power modules 35 to achieve cold weather heat outputs of up to 72,000 Btu/hr. This feature is also expected to lead to a significant benefit to consumers, since these cost reductions are applied to the high temperature heat input components of the system, and these are usually the highest cost components of an absorption system.

Although preferred embodiments of the invention have been herein described, it will be understood that various changes and modifications in the illustrated and described structure can be affected without departure from the basic principles that underlie the invention. Changes and modifications of this type can therefore deem to be circumscribed by the spirit and scope of the invention, except as the same may be necessarily modified by the appended claims or reasonable equivalence thereof.

I claim:

1. An absorption refrigeration and heating system in connection with a cooling or heating load and a heat sink or source to selectively provide heat to or remove heat from the load, comprising:
   a. at least one first subsystem for operation at higher temperature and at least one second subsystem for operation at lower temperature relative to the first subsystem;
   b. each subsystem having components of absorber means, desorber means, condenser means, and evaporator means operatively connected together;
   c. with the desorber means of the first subsystem, the condenser means of the first subsystem, and the desorber means of the second subsystem in sequential heat exchange relationship from a central chamber means in which external heat is applied to the system and is progressively exchanged outwardly through coaxial second and third chamber means.

2. A system according to claim 1 wherein the desorber means of the first subsystem, the condenser means of the first subsystem, and the desorber means of the second subsystem are combined in a unitary power module wherein these component means progressively exchange heat outwardly and progressively from the higher temperature desorber to the higher temperature condenser to the lower temperature desorber.

3. A system according to claim 2 wherein the unitary power module includes coaxial sequentially larger chambers that are separated by heat conductive walls but which are fluid impervious from one chamber to the next.

4. A system according to claim 3 wherein the heat conductive walls are of radially fluted configuration.

5. A system according to claim 4 wherein the chambers are substantially circular in cross section and substantially cylindrical in coaxial configuration.

6. A system according to claim 4 wherein at least one of the chambers is provided with a reservoir at its higher end from which a refrigerant - absorbent solution is dispersed on the outer walls of the adjacent internal chamber.

7. A system according to claim 4 wherein at least one chamber is provided with a separator wall means to prevent splashing and solution exchange between the first subsystem desorber and condenser.

8. In an absorption refrigeration and heating system in connection with a cooling or heating load and a heat sink or source to selectively provide heat to or remove heat from the load, comprising:
   a. at least one first subsystem for operation at higher temperature and at least one second subsystem for operation at lower temperature relative to the first subsystem;
   b. each subsystem having components of absorber means, desorber means, condenser means, and evaporator means operatively connected together;
   c. with the condenser means of the higher temperature subsystem in heat exchange relationship with a desorber means of the lower temperature subsystem, and with external heat applied to the desorber means of the higher temperature subsystem; and
   d. means to selectively arrange heat exchange relationships between the load and at least two of the component means including the higher temperature absorber, higher temperature evaporator, lower temperature condenser, lower temperature evaporator, and lower temperature absorber, while arranging heat exchange relationships between at least one of the other component means and the heat sink or source;

e. the improvement comprising: combining the higher temperature desorber, the higher temperature condenser, and the lower temperature desorber in a unitary power module wherein these component means progressively exchange heat outwardly and progressively from the higher temperature desorber to the higher temperature condenser to the lower temperature desorber.

9. A system according to claim 8 wherein the heat exchange relationships of (d) are carried out by a hydronic fluid and conveyed by a plurality of pumps through a plurality of valve means directing the hydronic fluid alternatively between the load and the heat sink or source.

10. A system according to claim 8 wherein the unitary power module includes coaxial sequentially larger chambers that are separated by heat conductive walls but which are fluid impervious from one chamber to the next.

11. A system according to claim 9 wherein the heat conductive walls are of radially fluted configuration.

12. A system according to claim 10 wherein the chambers are substantially circular in cross section and substantially cylindrical in coaxial configuration.

13. A system according to claim 10 wherein at least one of the chambers is provided with a reservoir at its higher end from which a refrigerant - absorbent solution is dispersed on the outer walls of the adjacent internal chamber.

14. A system according to claim 10 wherein at least one chamber is provided with a separator wall means to prevent splashing and solution exchange between the first subsystem desorber and condenser.

15. A power module apparatus for an absorption heat exchange system having components including a higher temperature first desorber, a higher temperature condenser, and a lower temperature desorber, the power module comprising:
   a. a central chamber means having a substantially vertically oriented axis and an inner wall or walls for the application of externally provided heat to the system by conduction through the walls,
   b. means for dispersing a first refrigerant/absorbent solution on an outer wall or walls of the central chamber means, to desorb refrigerant vapor from the solution,
   c. a substantially coaxial second chamber means having a substantially vertically oriented inner wall or walls surrounding and spaced apart from the outer walls of the first chamber, to condense the refrigerant vapor on the inner walls of the second chamber means,
   d. means for dispersing a second refrigerant/absorbent solution on the outer wall or walls of the second chamber means to desorb refrigerant vapor from the second solution,
   e. a substantially coaxial third chamber means having a substantially vertically oriented inner wall or walls surrounding and spaced apart from the outer walls of the second chamber means to contain the refrigerant vapor from the second solution, and
   f. conduit means from the second and third chambers means to collect and convey the separated vapor and condensate from the respective chambers, to the other components of the absorption system.

16. An apparatus according to claim 15 wherein the heat conductive walls are of radially fluted configuration.

17. An apparatus according to claim 15, having a separator wall means positioned between the outer wall or walls of the first chamber means and the inner wall or walls, of the second chamber means.

18. A power module according to claim 15 wherein the chambers are circular in cross sectional shape.

19. A power module according to claim 15 wherein he chamber means are closed at the top and bottom by annular ring means which join with the walls, to collect and convey the separated vapor and condensate from the respective chambers.

20. A power module according to claim 15 wherein the means for dispersing the refrigerant/absorbent solutions comprise an annular reservoir at the top of the second and third chambers means respectively.

21. A power module according to claim 20 wherein the reservoirs are fed by coaxial inlet conduits entering the module from a position at or near the top of the module.

22. A power module according to claim 21 wherein the inlet conduits support a baffle plate that extends partially across the open end of the reservoirs for the refrigerant/absorption solutions.

23. A power module according to claim 15 wherein the separator wall means extends to a position at or near the top of the second chamber means.

24. A absorption power module according to claim 15 wherein the externally provided heat is provided from the condensation of high temperature vapor in the central chamber means.

25. An absorption refrigeration and heating system in connection with a cooling or heating load and a heat sink or source to selectively provide heat to or remove heat from the load, comprising:
   a. at least one first subsystem for operation at higher temperature and at least one second subsystem for operaion at lower temperature relative to the first subsystem;
   b. each subsystem having components of absorber means, desorber means, condenser means, and evaporator means operatively connected together to sequentially absorbe and desorb a soluble refrigerant from an absorbent solution;
   c. with the desorber means of the first subsystem, the condenser means of the first subsystem, and the desorber means of the second subsystem in sequential heat exchange relationship from a central chamber means in which external heat is applied to the system and is progressively exchanged outwardly through coaxial second and third chamber means;
   d. each subsystem having a solution heat recuperator means connected between the desorber means and the absorber means and having sequentially a precooler means, and a superheater means connected between the condenser means and the evaporator means, with the superheater means in heat exchange relationship with refrigerant being conveyed from the evaporator means to the absorber means.

26. A system according to claim 25 wherein a condensate recuperator means is provided in heat exchange relationship with condensed refrigerant passing from the condenser means of the high temperature subsystem to the precooler of the high temperature subsystem, the condensed refrigerant exchanging heat with refrigerant solution passing to the desorber of the low temperature subsystem from the absorber of the low temperature subsystem.

27. A system according to claim 26 wherein a rectifier is connected for refrigerant vapor passage between the desorber of the low temperature subsystem and the condenser of the low temperature subsystem, the rectifier being in heat exchange relationship with the solution passing from the absorber of the low temperature subsystem to the desorber of the low temperature subsystem.

28. A system according to claim 27 wherein the condensate recuperator, the rectifier, and the solution heat recuperator are connected between the desorber and absorber of the low temperature subsystem and are combined in a QUAD unit recouping heat in the total system and transferring said heat through the refrigerant-absorbent solution passing from the absorber to the desorber of the low temperature subsystem.

29. A system according to claim 25 wherein valve means and a reservoir are provided between the outlets of the evaporator means and the absorber means of the high temperature subsystem, to bypass the refrigerant around the absorber when the system is operated in the cold ambient heat pump mode.

* * * * *